(12) United States Patent
Strümpler (10) Patent No.: US 6,738,246 B1
(45) Date of Patent: May 18, 2004

(54) ELECTRICAL CIRCUIT BREAKER FOR PROTECTING AGAINST OVERCURRENTS

(75) Inventor: Ralf Strümpler, Gebenstorf (CH)

(73) Assignee: ABB Research Ltd, Zurich (CH)

( * ) Notice: Subject to any disclaimer, the term of this patent is extended or adjusted under 35 U.S.C. 154(b) by 109 days.

(21) Appl. No.: 10/009,800

(22) PCT Filed: Jun. 14, 2000

(86) PCT No.: PCT/CH00/00325

§ 371 (c)(1),
(2), (4) Date: Dec. 13, 2001

(87) PCT Pub. No.: WO00/79664

PCT Pub. Date: Dec. 28, 2000

(30) Foreign Application Priority Data

Jun. 17, 1999 (DE) .......................... 199 27 762

(51) Int. Cl.[7] .............................. H02H 3/08; H02H 9/08; H02H 9/02; H02H 5/04
(52) U.S. Cl. ...................... 361/93.1; 361/939; 361/102; 361/104
(58) Field of Search .............................. 361/93.1, 93.9, 361/99, 102, 104; 200/181, 10, 270, 275; 218/2–7, 16, 30, 48, 146; 307/112, 115, 131; 385/17, 16

(56) References Cited

U.S. PATENT DOCUMENTS

| 5,430,597 A | | 7/1995 | Bagepalli et al. ............ 361/102 |
| 5,864,458 A | * | 1/1999 | Duffy et al. ................ 361/93.9 |
| 6,052,268 A | * | 4/2000 | Thomas ...................... 361/93.1 |
| 6,178,075 B1 | * | 1/2001 | Endicott et al. ............ 361/104 |
| 6,201,678 B1 | * | 3/2001 | Kolbas et al. ............. 361/93.5 |
| 6,317,530 B1 | * | 11/2001 | Ford ........................... 385/17 |
| 6,373,007 B1 | * | 4/2002 | Calcatera et al. ........... 200/181 |

FOREIGN PATENT DOCUMENTS

| DE | 198-46-639 A1 | 4/2000 |
| DE | 198 50 397 A1 | 5/2000 |
| GB | 2 212 679 A | 7/1989 |

OTHER PUBLICATIONS

Dr. Helmut F. Schlaak, et al.; Silicon–microrelay with Electrostatic Moving Wedge Actuator—New Functions and Miniaturisation by Micromechanics; pp. 463–468; 1996.

K. E. Peterson; Micromechanical Membrane Switches on Silicon; IBM J. Res Develop, vol. 23, No. 4; Jul. 1979; pp. 376–385.

Roger Allan; Simplified Process is Used to Make Micromachined Fet–Like Four–Terminal Microswitches and Microrelays; Electronic Design; Jul. 8, 1996; pp. 31 and 32.

H. Blanchard, et al.; Cylindrical Hall Device; IEEE; 1996; Appendix 2.

* cited by examiner

*Primary Examiner*—Pia Tibbits
(74) *Attorney, Agent, or Firm*—Burns, Doane, Swecker & Mathis, L.L.P.

(57) ABSTRACT

The invention relates to a combination of a microrelay switch (1) switching off small overcurrents, and a short-circuit current limiter, for example a fuse link, a PTC thermistor 16 or a power breaker, for limiting or switching of large overcurrents.

18 Claims, 6 Drawing Sheets

ELECTRICAL CIRCUIT BREAKER FOR PROTECTING AGAINST OVERCURRENTS

The invention relates to an electrical switching device for switching off an overcurrent in a current path. In particular, the invention in this case relates to the field of domestic electrical power supply, to the field of relatively small and medium-size electric motors, to building technology, to lighting systems and to electrical systems in railroad vehicles, ships and the like. These fields of application can be characterized by the fact that the voltages to be switched off are typically 100 V–1 kV, and the typical load currents are in the range 0.1 A–75 A, although these numerical figures should not be regarded as representing any restriction. In particular, very large current values can occur briefly in the event of large overcurrents caused by a short circuit or the like.

The invention relates to a switching device which can switch off not only relatively small overcurrents, which are in the range 1.1 to 10 times the maximum permissible current, but also very large overcurrents of many times the maximum permissible current, in order to protect an electrical device against damage or to be prevent damage to the environment or to personnel. In the prior art, combinations of electromagnetic contactors, fuse links, thermal overload relays with a bimetallic strip as the tripping element, and the like have been used until now.

On the other hand, electrical systems and devices have been becoming ever more complex in recent times, particularly in the low-voltage field, while, on the other hand, there has been an increasing requirement to reduce the total price, the physical volume, the weight and also the power losses.

The invention is based on the technical problem of finding an improved electrical switching device for switching off overcurrents.

The invention solves this problem by means of an electrical switching device having a microrelay switch in a current path, having a short-circuit current limiter in the current path for interrupting a large overcurrent, and having an evaluation device for receiving and evaluating signals from a current sensor which detects the current through the current path, with the switching device being designed such that the microrelay switch opens in response to a tripping signal from the evaluation device in the event of small overcurrents above a threshold value and, in the event of large overcurrents, the short-circuit current limiter limits these currents to currents which can be interrupted by the microrelay switch.

The invention is furthermore also based on an electric motor switching and protection system having such an improved switching device.

The fundamental idea of the invention is thus to use a microrelay switch in conjunction with a further component for short-circuit current limiting, instead of the conventional electromagnetic contactor. In this case, the microrelay switch is intended to be designed to switch off small overcurrents, and furthermore, can also be used for the normal switching on and off of the current in the current path during normal operation. In contrast to this, a further apparatus for short-circuit current limiting is designed specifically for switching off very large overcurrents, which would destroy the microrelay switch. An evaluation device is used for detecting overcurrents and for tripping the microrelay switch but, when required, can also be actuated directly for switching on and off. The invention thus makes it possible to save the conventional components comprising thermal relays with bimetallic strips and electromagnetic contactors, and/or to replace them by a comparatively small and light electromechanical system.

The microrelay switch as such is prior art and is an electrically operated miniature switch. In contrast to a transistor, a microrelay is, however, a mechanical switch with at least one moving contact piece.

This contact piece can be caused to move mechanically by means of an electrical signal in various ways. In general, such microrelay switches are produced using known methods for microelectronics and microsystem engineering.

The devices for the invention are preferably electrostatically operated microrelay cells, that is to say those in which the moving contact piece is operated electrostatically. In this context, reference is made to the exemplary embodiments and to an Si microrelay published by Siemens (H. F. Schlaak, F. Arndt, J. Schimkat, M. Hanke, Proc. Micro System Technology 96, 1996, pages 463–468). Reference is also made to R. Allen: "Simplified Process is Used to Make Micromachined FET-like Four-Terminal Microswitches and Microrelays" in Electronic Design, 8 Jul. 1996, page 31, and to "Micromechanic Membrane Switches on Silicon" in K. E. Petersen, IBM J. RES. DEVELOP., Volume 23, No. 4, Jul. 1979, pages 376–385.

The expression microrelay switch, for the purposes of this invention, relate to a switching device which has at least one microrelay cell. As described in detail further below, the microrelay switch may, however, be a complex system comprising a number of individual microrelay cells, with each individual cell having (at least) one moving contact piece.

In comparison to the described conventional component combinations, the switching device according to the invention thus offers a considerable reduction in weight and physical volume. The geometric flexibility of the overall arrangement is also improved, since the microrelay switch can be installed in widely differing manners, is at the same time particularly robust and insensitive to temperature fluctuations, shocks or the like and, in the case of a relatively large arrangement having a large number of microrelay cells, also provides major design freedom, since the conductor tracks between the microrelay cells can be formed as required.

A further primary advantage of the novel electrical switching device is the very rapid response of the microrelay switch. Due to the very much lower inertia of the moving masses, this represents a fundamental advantage in comparison to solutions using conventional contactors and relays. This is still true without any restriction even in the case of relatively complex microrelay switches having a greater number of microrelay cells, since the response time in this case is essentially the same as that with a single cell.

Furthermore, typical switching ratings and the power consumption of microrelay switches in the quiescent state are considerably reduced in comparison to conventional relays and contactors, and thus contribute to power saving and to reducing thermal problems, in particular in relatively large systems. Furthermore, the switching device according to the invention can also be used in combination with and for integration with other semiconductor-technology devices, in particular transistors and integrated circuits, since there are considerable corresponding features and overlapping areas in the production methods. The weight, volume and cost can thus be reduced further.

The evaluation device is a preferably microelectronic circuit whose more detailed design is immediately obvious to a person skilled in the art with respect to the respectively required functions in the various embodiments of the invention. In this case, the evaluation device can be designed to produce a certain time delay, in particular also as a function of the magnitude of a measured overcurrent, in comparison to the physically fastest-possible response of the microrelay switch. Further details relating to this can be found in the description of the exemplary embodiments.

Since electrical switching devices or overcurrent protection have to cover a very wide range of current and voltage requirements, the microrelay switch can be produced using a largely unchanging standard technology with different layout geometries, that is to say different mask sets. Widely differing electrical specifications can be covered in this case with a high level of technological standardization of the production line.

However, since microrelay switches are invariably subject to certain limits in terms of their current and voltage load capacity during operation in the field of present-day technology, and also during disconnection, the invention relates to a combination with a further element which is designed specifically for switching off large overcurrents. This refers to a short-circuit current limiter, with this term in this case referring only to a frequent cause of such large overcurrents, but not being restricted to this. The term short-circuit current is thus largely synonymous to large overcurrents, which considerably exceed the capacity to be switched off by the microrelay switch.

One particularly simple version of a short-circuit current limiter is a conventional fuse link which interrupts a large overcurrent by the melting of an incandescent filament or of a conductor track, but does not operate repetitively, that is to say it must be replaced. Such a fuse link is blown by the overcurrent itself, and thus does not require any actuation by the evaluation device.

A further option, however, is electrically operable tripping of the short-circuit current limiter. In this case, it is possible, but not essential, for the actuation of the short-circuit current limiter to use a further actuation signal (referred to as a second actuation signal in the following text) from the same evaluation device which also actuates the microrelay switch. By way of an example, an electrically tripped power breaker can be used for this purpose. However, it is also possible to use an entirely conventional power breaker, for example with an electromagnetic drive supplied by a short-circuit current.

A further version of the invention is for a PTC thermistor to be used as a short-circuit current limiter, or in addition to another switch, in a short-circuit current limiter. Such a PTC thermistor is defined by its electrical resistance having a positive temperature coefficient, which is sufficient that the heating of the thermistor at very large overcurrents causes a sufficiently severe rise in the resistance value to limit the overcurrent to values which can be switched off by the microrelay switch. This is the explanation of the term short-circuit current limiter, which thus covers both components which completely interrupt the short-circuit current and components which limit it to values which can be switched off by the microrelay switch.

Preferable PTC materials include PTC polymers, which generally consist of a polymer matrix with a filling material which is distributed in it and promotes electrical conductivity. The filling material may be, for example, metal particles, carbides, borides, nitrides, short carbon fibers, conductive polymer particles or else carbon black. Limiting can in this case can be carried out by means of a resistance rise by a factor of at least 2.5 in a temperature interval of 14 K, a factor of 6 in a temperature interval of 30 K, or a factor 10 in a temperature interval of 100 K, satisfying a criterion for definition. Preferable factors in this case are 5, 20 and 100, or 7.5, 100 and 1000, in the respective temperature intervals.

According to a further version of the invention, the switching device furthermore contains a fault current protection function. For this purpose, the current through two current paths is either detected or compared by means of two current sensors, with the result of this evaluation being used appropriately to open at least one microrelay switch in one of the two current paths, or a current sensor which is referred to here as a total current sensor can also be used to detect and evaluate a total current through two adjacent current paths, in order to open the microrelay switch. This is intended to mean a current sensor which, on the basis of the spatial conditions, detects the total (calculated for fault current detection) of both currents, taking into account their directions. For example, two conductor tracks as the current paths may carry the currents to be compared in mutually opposite directions, with the total current sensor detecting the total current, that is to say a zero current if the magnitudes of the currents are the same. Accordingly, the signal from the total current sensor may be compared only with a correspondingly small threshold value by the, evaluation device, in order to actuate the microrelay switch.

The fault current protection function can also, of course, relate to more than two current paths, for example with four current sensors for a three-phase current with a neutral line.

The current sensors mentioned several times in this description need not necessarily be part of the switching device according to the invention. In the simplest case, they may be conventional current sensors, for example induction coils. However, the invention preferably relates to Hall sensors, which can be produced with very small verification limits, for example with verification limits of about 1 mA in comparison to conventional verification limits of approximately 10 mA or more. Hall sensors can furthermore be produced as semiconductor elements to be very much smaller, lighter and also cheaper than conventional induction coils.

On the basis of what has been said above, the term microrelay switch may mean both an individual microrelay and a circuit comprising a relatively large number of microrelay cells. This should be understood in particular as meaning that, in any case in the present-day development standard, microrelays do not have an unrestricted current-carrying capacity and withstand voltage, and have only limited capabilities to switch off relatively high power levels. When the particular applications require load capacities beyond the given limits, of an individual microrelay cell, it is possible to use, according to the invention, voltage-dividing series circuits comprising two or more microrelay cells, and/or current-dividing parallel circuits. When combined, these are switch panels, namely voltage-dividing series circuits or parallel circuits which have a current-dividing effect in each stage of the series circuit.

However, in this context, it must be remembered that the technological limits in the present-day situation are subject to continual changes. Further improvements can be predicted with respect to the voltage and load capacities when switched on, and also with respect to the disconnection capacity. A joint research project between the manufacturer Bosch and a group at Bremen University is working on the development of microrelays with a maximum switching voltage of 24 V, and a maximum switching current of 25 A. It can thus be assumed that, in future, it will be possible, to satisfy even applications with somewhat more stringent requirements just by individual microrelays. This relates in particular to the current-carrying capacity, and it should then be possible to achieve the required withstand voltage by appropriate series connection.

Reference should now be made once again to an already mentioned advantage of the technologies that are typical for microrelays. For matching to a specific electrical configuration, a standardized microrelay cell based on a fixed standard technology can be designed for different parameter magnitudes by parallel and/or series connection. This can be done just by changing the layout geometry, for example by using a different mask set. The rest of the production process can remain virtually unchanged. This exploits the likewise already mentioned advantage of the very high response speed without scaling directly into the overall circuit. It is thus possible to produce extremely fast-response switching devices, in particular, with stringent specification values, in comparison to equivalent conventional contactors.

In addition to the integration of a switch panel having a number of microrelay cells, other integration versions are also of importance to the invention. The microrelay switch or switches, the evaluation device and, possibly, also the Hall sensor or sensors can, on the one hand, each be in the form of semiconductor chips and can be mounted on a common circuit board. This itself results in considerable advantages since the mounting technologies are identical or similar, and the combined components have a small physical size and low weight. As an example of a form of a Hall sensor which is highly related to microelectronics, reference is made here to the "Cylindrical Hall Device" by H. Blanchard, L. Chiesi, R. Racz and R. S. Popovic, Proceedings IEDM 96, pages 541–544, IEEE 1996.

When combined with a Hall sensor, it may, on the other hand, be advantageous to dispense, with complete integration, since it then possible to design a more highly standardized switching device using Hall sensors of different design depending on the application, for respective response values.

It is, of course, also possible for different components to be combined with one another on one chip. For example, the evaluation device and the microrelay switch or switches may be integrated. With suitable technology, this also relates to the Hall sensor or sensors. If, on the other hand, only the evaluation device and the Hall sensor or sensors are integrated, while the microrelay switch or switches, is or are in the form of a separate chip or chips, this allows the combination of a standardized chip with an evaluation device and a Hall sensor or Hall sensors with different, electrically differently designed, microrelay switches. Furthermore, temperature sensors, timer circuits and other electronic devices can also be combined and integrated.

In addition, this also relates to an electronic response monitoring device, which can likewise be combined or integrated. Such a response monitoring device registers the response of the electrical switching device and may, for example, be used to inhibit the switching device for a certain amount of time after it has tripped. Furthermore a defined test can be carried out after tripping, for example by means of a short switched-on state, in which a check is carried out to determine whether the fault state that was responsible for the previous tripping is still present. Automatic reconnection is thus possible, for example, following a temporary current surge. Interfaces to external control devices can also be provided.

In addition, timer circuits can also be combined or integrated, for example allowing use as an automatic time switch for lighting applications, for example stairwells.

Finally of course, devices for indicating the response to an overcurrent or a fault current in a visual or audible form are also possible.

One preferred application of the invention is a switching and protection system for an electric motor. The exemplary embodiments which are described in detail in the following text also relate to this, in which case, disclosed features may also be significant to the invention in other combinations. In the figures:

Figures 1, 2:
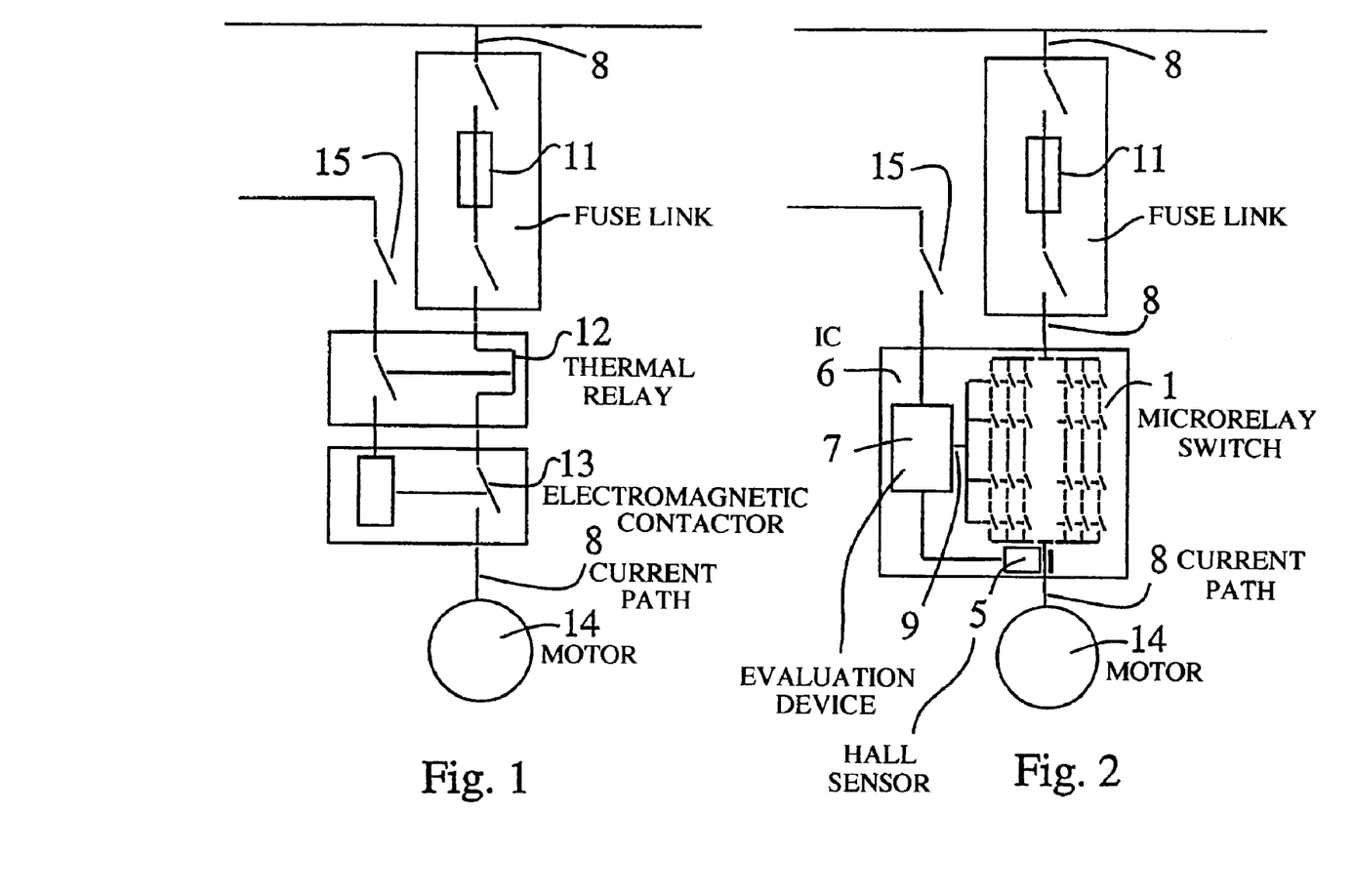
FIG. 1 shows a conventional electric motor switching and protection system.
FIG. 2 shows an electric motor switching and protection system according to the invention, having a switching device according to the invention, as a first exemplary embodiment.

First of all, FIG. 1 shows the prior art. In this case, a device for switching and for protection of an electric motor 14 in a current path 8, which supplies the electric motor 14, has a fuse link 11 for protection against very large overcurrents, and a combination of a thermal relay 12 and an electromagnetic contactor 13 for protection against small overcurrents. The thermal relay 12 detects small overcurrents by the heating of a bimetallic strip, with the opening bimetallic strip interrupting the current supply to the electromagnetic contactor 13, in response to which this opens and hence interrupts the power supply to the electric motor 14. A switch 15 in the supply to the electromagnetic contactor 13 is used for switching the electric motor 14 on and off during normal operation.

In contrast, FIG. 2 shows an arrangement according to the invention, in which the thermal relay 12 and the electromagnetic contactor 13 have been replaced by a microrelay switch 1 with a Hall sensor 5, integrated on the same chip 6, as the current sensor, and an evaluation device 7, which actuates the microrelay switch via a tripping signal 9. The rest of the elements correspond to the conventional example in FIG. 1.

Figure 3:
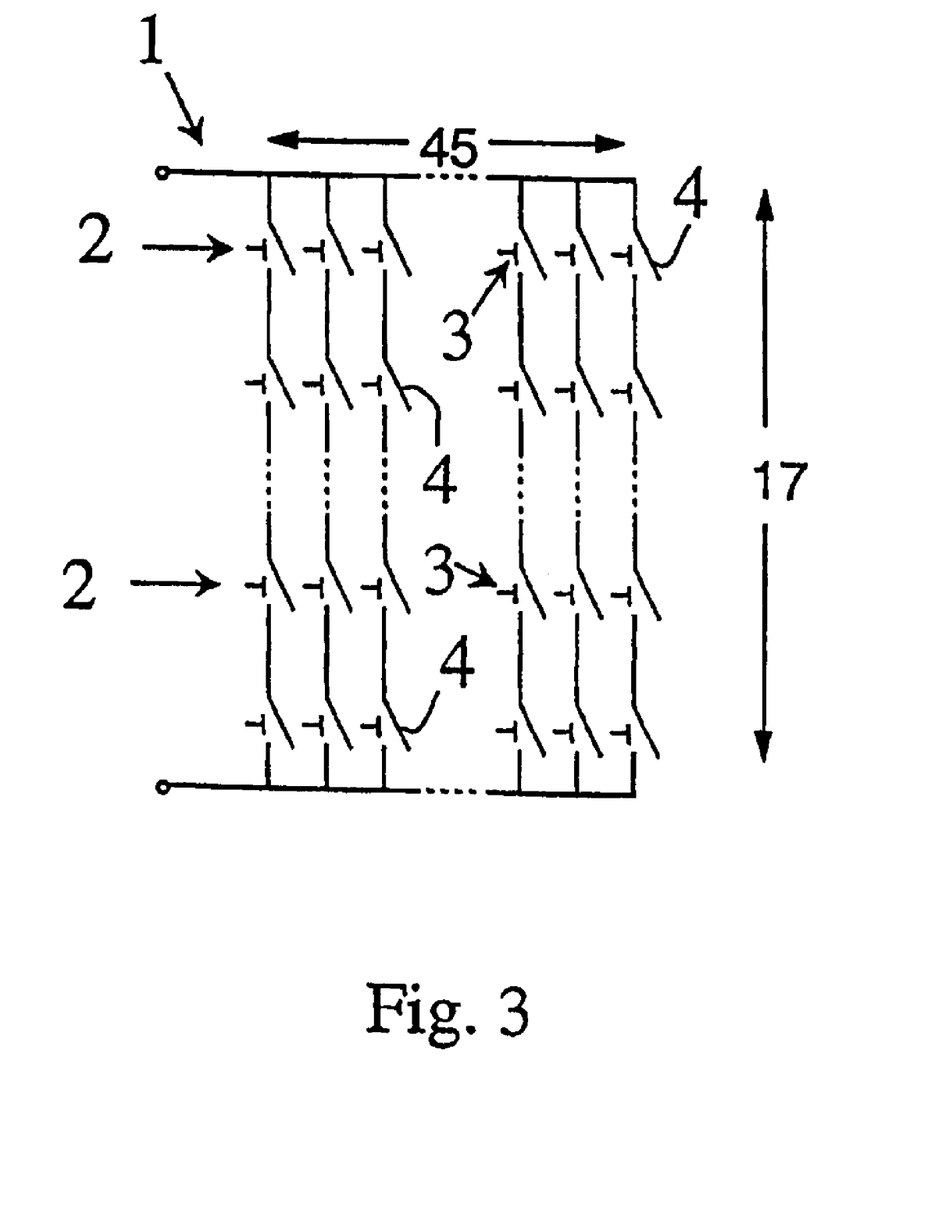
FIG. 3 shows an illustration of a detail from FIG. 2, with details of the microrelay switch.

The construction of the microrelay switch 1 will be explained in detail first of all. In this context, FIG. 3 shows the microrelay switch 1 formed from 17 series-connected stages 2, each having 45 parallel-connected microrelay cells 3. Each microrelay cell 3 corresponds technologically to the already mentioned Siemens silicon microrelay, and is electrically connected to in each case one microrelay cell 3 in the previous stage 2, and one in the subsequent stage 2. For the first and last of the stages 2, the connections are in each case joined together on the respective outer side, and are connected to a common connection of the microrelay switch 1.

In a highly schematic illustration, it is also possible to see a moving contact piece 4 which, in this case, corresponds to a bar which can be bent or deflected electrostatically. The essential feature of the switching device according to the invention is that all these movable contact pieces 4 operate in synchronism, that is to say they are opened and closed by a single common signal, to the extent that parts act on a jointly constructed, standard switch.

Each individual microrelay cell 3 can interrupt a voltage of about 24 V, so that the microrelay switch 1 can switch off a voltage of 400 V This value is advantageous for many applications and, in particular, values above 200 or 300 V are preferable.

The load current which can be switched by each microrelay cell 3 is about 200 mA, thus resulting in a total current of about 9 A for the microrelay switch 1.

These values are chosen such that they can be compared directly with a conventional standard contactor (for example A9 contactor (ABB Control, France)). This electromagnetic standard relay, with a disconnectable voltage of 400 V and a 9 A switchable load current, consumes an activation power of 2 W. In contrast, the entire microrelay switch 1 of the switching device according to the invention has an activation power of only 5 mW, which is reduced by a factor of more than 500. With present-day technology, the power losses when switched: on are somewhat lower (0.1 W) with conventional relays than for the microrelay switch 1 according to the invention, of 0.6–6 W. However, it will be possible to reduce this value considerably by further improvement of the contacts, and possibly by increasing the closing force of the microrelays. Freedom is evident for the closing force, particularly with regard to the extremely low activation power.

When comparing these values it must be remembered that conventional contactors are switched off when no power is flowing, that is to say they consume said activation power when in the connected state. Thus, for example, the A9 contactor consumes about 2.1 W when switched on, which is thus a multiple of the value which can be achieved by the invention.

FIG. 2 shows the Si chip 6 corresponding to the switching device according to the invention and with the microrelay switch 1 which has already been described with reference to FIG. 3. In addition, the Hall sensor 5 is provided underneath the outermost (lowermost in the figure) stage 2 of the microrelay switch 1. This is a Hall sensor integrated on the Si chip 6, and is configured suitably for radial magnetic fields, such as those which occur in linear current conductors. In this context, reference is made to the already cited publication "Cylindrical Hall Device". The Hall sensor 5 requires an actuation power of about 60–360 mW.

This Hall sensor 5 is controlled via a connecting line by the evaluation device 7, which evaluates the output signal from the Hall sensor 5, and applies the appropriate current to the Hall sensor 5. To be precise, the evaluation device 7 compares the output signal from the Hall sensor 5 with a threshold value for definition of overcurrents. On detecting a current which is greater than an adjustable threshold value, the evaluation device 7 responds, and emits, via the line 9, a tripping signal to the microrelay switch 1, that it to say the microrelay switch 1 is switched between the switched-on and switched-off states. All the moving contact pieces 4 of the individual microrelay cells 3 are opened simultaneously and are closed simultaneously.

In this case, a time delay can be introduced, which prevents excessively fast response of the microrelay switch 1 before the short-circuit current limiter. This is because, if the microrelay switch 1 responds too quickly when the currents to be switched off are large, these large currents must be interrupted by the microrelay switch 1. It may therefore be advantageous to delay the opening process of the microrelay switch 1 until the short-circuit current limiter has carried out its function in the presence of this time delay, in any case when currents are dangerous to or could destroy the microrelay switch 1. In this case it must be remembered that the response of many short-circuit current limiters, for example fuse links or bimetallic tripping mechanisms in power breakers, become ever faster as the current to be switched off increases. Conversely, the response is slower when the currents to be switched off are smaller. To this extent, the time delay of the microrelay switch 1 can be chosen to be just sufficiently long that the short-circuit current limiter just interrupts for this time delay, for all currents which are dangerous to the microrelay switch 1.

The actuation of the microrelay switch 1 by means of an evaluation device 7 makes it possible, in particular, to control the response of the microrelay switch 1 as a function of the magnitude of the measured current to be switched off, that is to say to allow the microrelay switch 1 to respond with a greater time delay to very, large overcurrents. It is also possible, for example for use in an electric motor switch and protection system, for the response of the microrelay switch to take account of the motor starting current, which is typically greater by a factor (for example 6) than the rated current. This means that the evaluation device 7 uses a higher threshold value while the motor is being started than during continuous operation, so that the threshold value during the starting phase is somewhat greater than the, motor starting current, and is, somewhat greater than the motor rated current during, the normal operating phase. In this context, reference is made to FIGS. 6 and 7 and the associated description in the following text.

In these exemplary embodiments, the evaluation device 7 is in the form of an integrated Si analogue circuit.

If required, it may also include a timer circuit 8, although this is not shown separately here.

Overall, the invention allows the function of a conventional contactor with actuation electronics and a current sensor to be implemented on the silicon chip 6 This results in a physical volume of the order of magnitude of (30×50×1) mm$^3$, with a weight of about 10 g, as against comparable values for the already mentioned conventional electromagnetic A9 contactor of: (44×74×74) mm$^3$ and 340 g.

In the first exemplary embodiment, in FIG. 2, a fuse link 11, as shown in FIG. 1, is connected in series with the microrelay switch 1, in the current path 8 The fuse link 11 is used as a short-circuit current limiter and is not separately actuated. It blows autonomously as a result of thermal overloading of a melting wire or of a conductor track and, accordingly, needs to be replaced. For this purpose, a switch is connected upstream of the fuse link 11, and a further switch, is connected downstream from it, in order to allow the terminals of the fuse link 11 to be disconnected, for potential replacement. The switch between the fuse link 11 and the microrelay switch 11 is worthwhile because the microrelay switch 1 does not generally allow direct visual inspection to check that it is open and, after very high currents have been passed through, it is possible in some circumstances for the moveable contact pieces 4 to be welded. A conventional mechanical switch thus offers greater assurance that the corresponding terminal of the fuse link 11 is not live.

The current path 8 shown here may actually also correspond to a multiphase line. However, it is possible for another phase to continue without being interrupted to the electric motor 14, so that the switching device according to the invention interrupts only one of, for example, two supplying current paths In general, this will be, done in the phase line while, in contrast, the neutral conductor can be continued uninterrupted.

Figure 4:
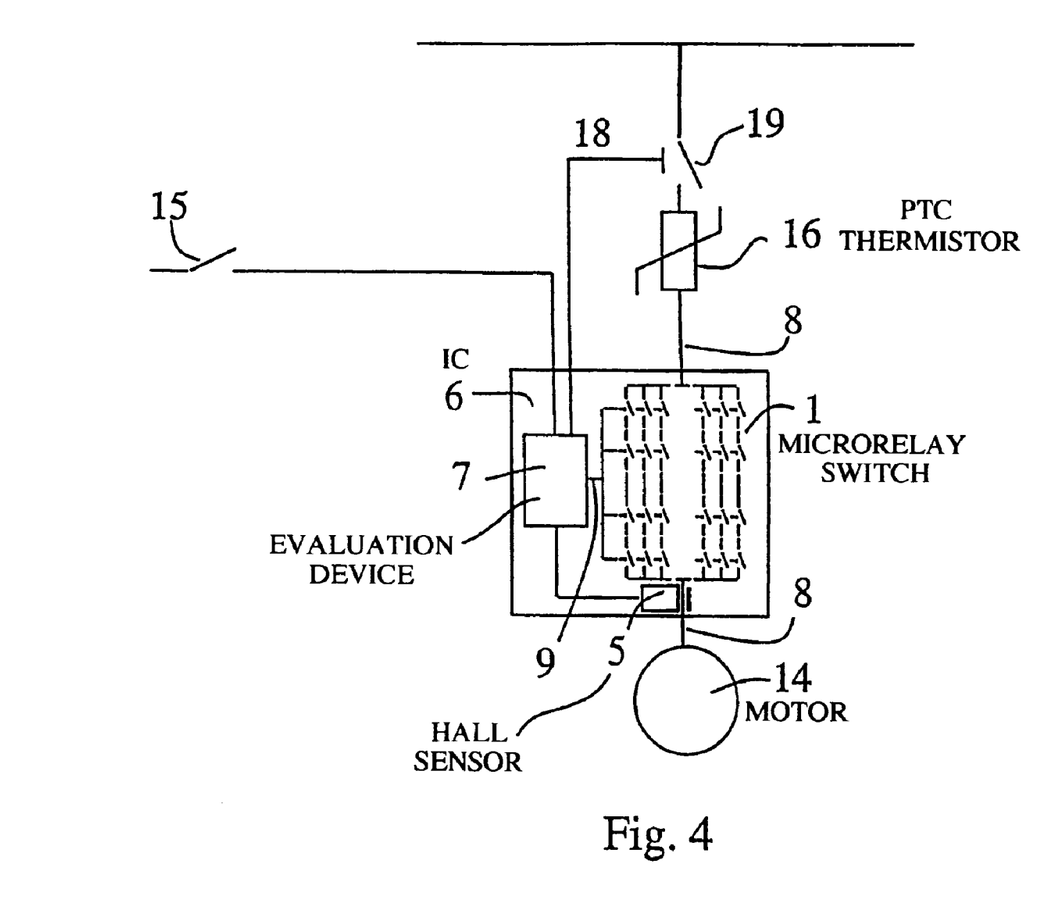
FIG. 4 shows an alternative to FIG. 2, as a second exemplary embodiment.

FIG. 4 shows an alternative, second embodiment. In this case, the fuse link 11 is replaced by a PTC polymer thermistor 16 which, as a short-circuit current limiter, limits large overcurrents in the manner already described to very low currents, due to the electrical resistance value rising very sharply, in which case the microrelay switch 1 may also be used for DC isolation. The above statements and the explanatory notes relating to FIGS. 6 and 7 apply to the capability to control the time response of the microrelay switch 1. The PTC polymer thermistor 16 also has a response which is faster for large overcurrents.

The PTC polymer thermistor 16 is a repetitive element, and need not be replaced after it has responded. When the overcurrent is switched off, the PTC polymer thermistor 16 cools down to normal temperature, and thus returns to the original state. The major advantage of a PTC polymer thermistor in comparison to a PTC metal thermistor is that a PTC polymer thermistor has a sudden resistance rise, with the electrical resistance increasing by such considerable factors that it virtually disconnects the current path. However, a PTC polymer thermistor requires a certain cross-sectional area in order to be able to carry the appropriate load and in order not to have an excessive resistance during normal operation, as well.

Typical orders of magnitude could be, for example, a maximum disconnection current of 10 A for the and microrelay switch 1 with a motor rated current of, for example 1 A, with the PTC polymer thermistor 16 responding at about 10 A. A PTC polymer thermistor 16 designed in accordance with the already cited application 198 33 609.8 dated Jul. 25, 1998, would have a typical volume of about 4 cm×2 mm (cross-sectional area)×2 cm (including metal contacts).

The single line 18 shown in FIG. 4 leads from the evaluation device 7 to a load-break switch 19 connected in series with the PTC polymer thermistor 16 and the microrelay switch 1. If the PTC polymer thermistor 16 has failed, or it has been impossible to prevent the moveable, contact pieces 4 of the microrelay switch 1 from welding due to excessively late response, this load-break switch 19 can be used to disconnect the current path and to interrupt the current. To do this, once a certain time period has passed since initial detection of an excessively high current, the evaluation device 7 uses the Hall sensor 5 to check the current once again and, if the Hall sensor 5 has not yet been interrupted, activates the load-break switch 19 via the signal line 18. At least for the DC isolation (which is no longer possible by means of the microrelay switch 1) of a current which is otherwise limited by the PTC polymer thermistor 16, the load-break switch can, however, also interrupt the current, provided the switching capacity is adequate. One of the switches, as shown in FIG. 2, upstream and downstream of the fuse link 11 can, of course, also be actuated via a signal line 18 in an appropriate manner.

Apart from this, the second exemplary embodiment corresponds to the first, shown in FIG. 2.

Figure 5:
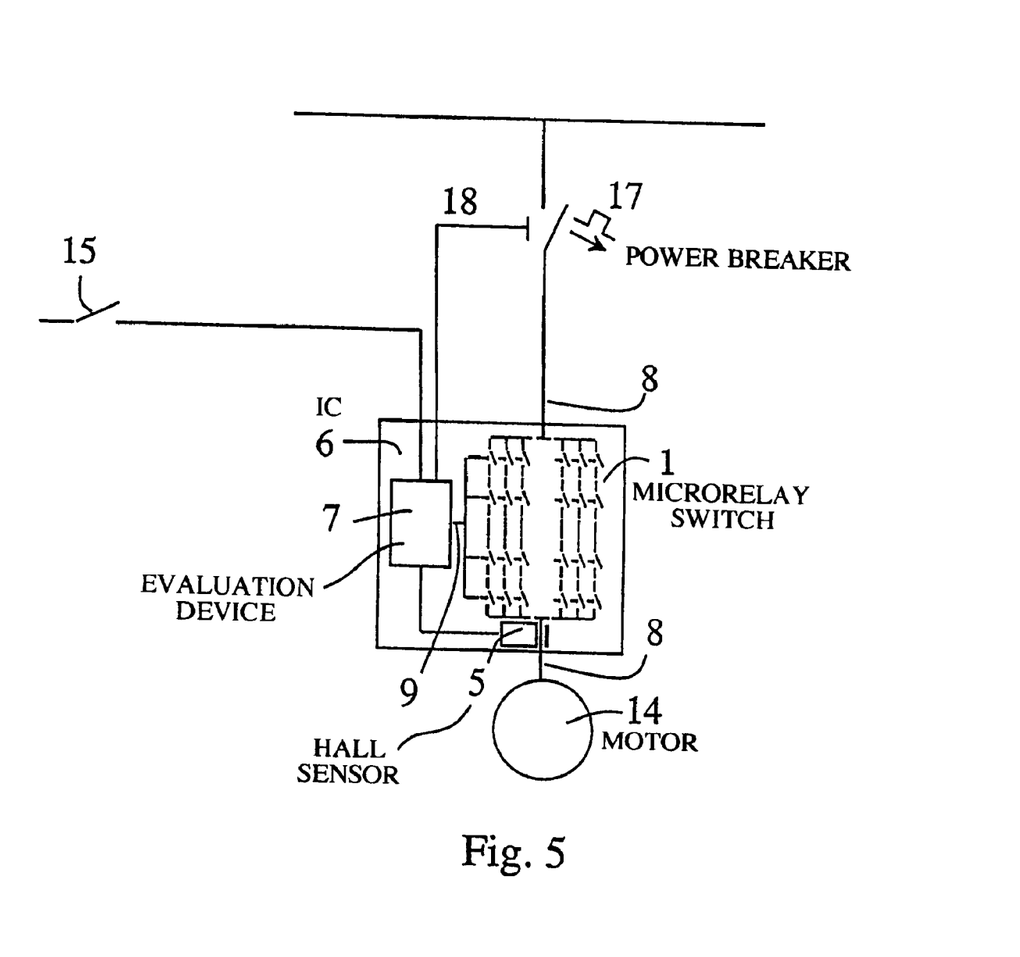
FIG. 5 shows a further alternative to FIGS. 2 and 4, as a third exemplary embodiment.

FIG. 5 shows a third exemplary embodiment. In this, case, a power breaker 17 is introduced instead of the fuse link 11 from FIG. 2 and the PTC thermistor 16 from FIG. 4. Apart from this, this exemplary embodiment likewise corresponds to the two exemplary embodiments shown in FIGS. 2 and 4. If a conventional power breaker 17 is used, then it normally has its own tripping mechanism, for example by means of an inductive drive, which responds to short-circuit currents. However, as an alternative to this, electrical tripping can also be provided by means of a further tripping signal, emitted via a line 18 (see FIG. 4), from the evaluation device 7. The line 18 in FIG. 5 should thus be regarded as an optional feature. Furthermore, in this case, although it is possible to retain the conventional inductive short circuit current tripping in the power breaker 17, it is, however, possible to dispense with the bimetallic tripping, which is likewise conventionally provided, in response to relatively small overcurrents. This can then be replaced by tripping initiated by the evaluation device 7 via the line 18.

An exemplary embodiment with a fault-current protection function would differ from the exemplary embodiments described here only by the evaluation device 7 having corresponding additional functions, and by the Hall sensor 5 detecting the total current through two adjacent current paths, or by providing two Hall sensors.

Figure 6:
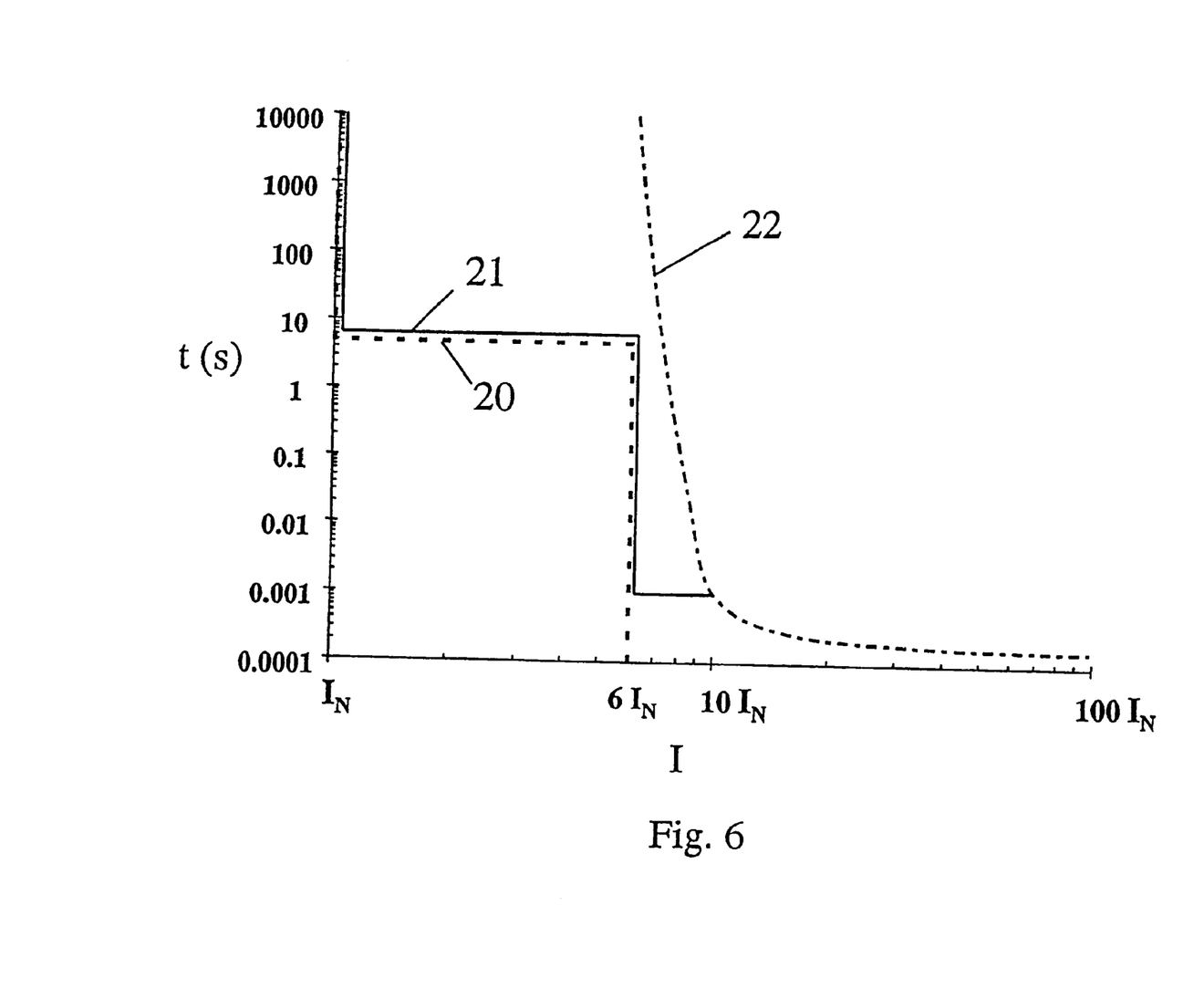
FIG. 6 shows a timing diagram to explain the second exemplary embodiment from FIG. 4.

FIG. 6 shows an example of the time response of the microrelay switch 1 and of the PTC polymer thermistor 16 from FIG. 4 for the preferred exemplary embodiment of an electric motor switching and protection system. The current axis, annotated I, indicates a motor rated current $I_N$ (in this case 1 A), and a motor starting current amounting to six times the motor rated current $I_N$. The time axis, annotated t, indicates the physically shortest possible response of the microrelay switch of (as an example) 0.0001 s at its lower end, and the typical time duration of the motor starting current, as 5 s. The dashed line with the reference number 20 shows, schematically, the starting response of the electric motor, which draws the current 6 $I_N$ for a period of 5 s, after which the current $I_N$ is drawn. The response characteristic of the microrelay switch 1 and of the evaluation device 7, must be adapted accordingly, as symbolized by, the line 21. The circuitry to provide this response is implemented in the evaluation device 7. The line 22 shows a typical response of a PTC polymer thermistor 16, with the response speed increasing for large currents.

In this case, the physically predetermined time delay of 0.0001 s has been increased by means of the evaluation device, in order to shift the intersection of the lowermost horizontal section of the line 21 with the line 22 toward lower current levels, in order thus to reduce the currents to be switched by the microrelay switch 1 for a faster response. In this case, the value of 0.1 s is a typical value for the response of a conventional contactor. Even with this better value of about 0.03 s for a contactor, the value of 0.001 s chosen for the microrelay switch in this case is thus considerably shorter so that, even if concessions are made with regard to the described reduction in the current that is to be switched quickly, considerable improvements are thus still possible in comparison to the prior art.

Figure 7:
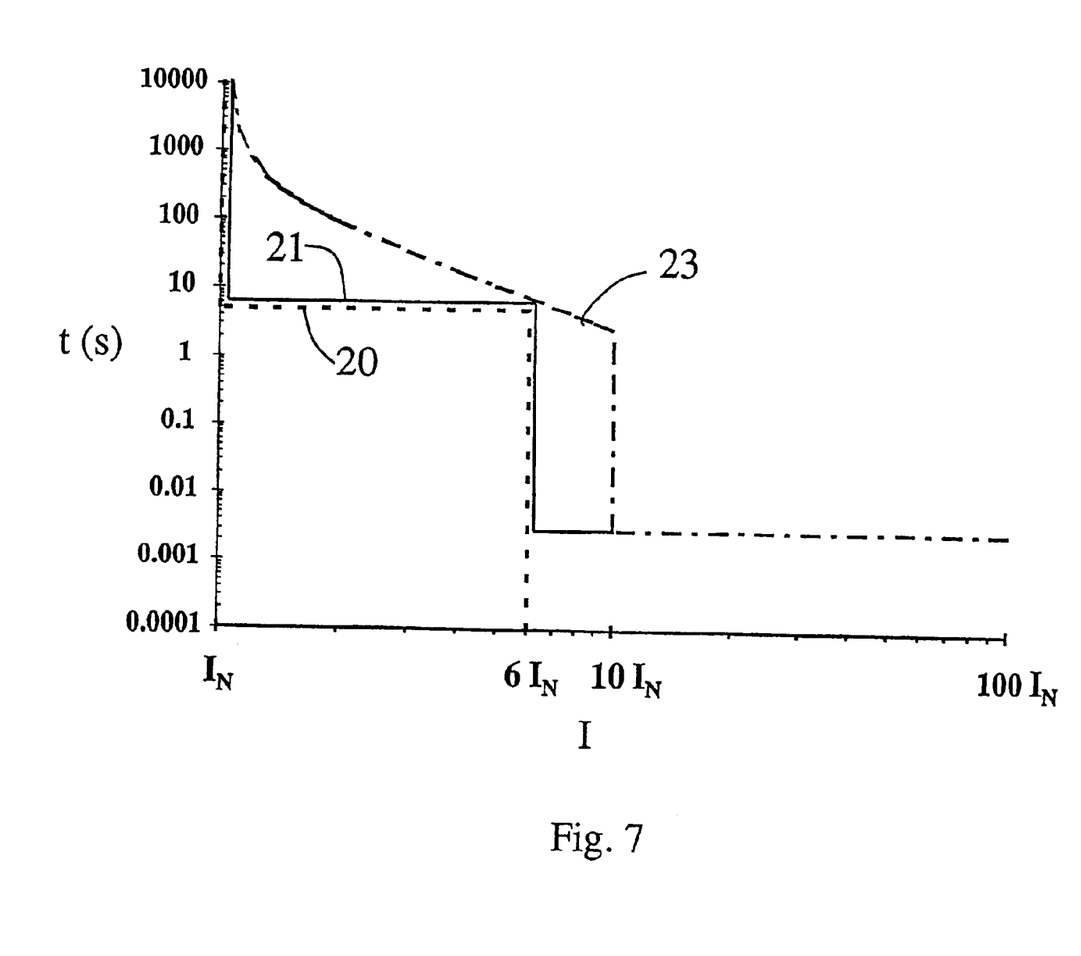
FIG. 7 shows a further timing diagram to explain the third exemplary embodiment from FIG. 5.

FIG. 7 shows a diagram analogous to FIG. 6, but relating to the exemplary embodiment shown in FIG. 5. In this case, the line 23 shows the response of the power breaker 17 which is governed in the upper region by conventional bimetallic overcurrent tripping, and in the lower, horizontally running, region of the curve 23, by the response time of the electromagnetic impact armature, which is largely constant independently of the current. If the response of the microrelay switch 1 is delayed by the evaluation device 7 to such an extent that it results in a comparatively earlier response of the power breaker after about 0.003–0.005 s in response to large currents, these values are still considerably below the conventional values that have been mentioned. One precondition for this is that the microrelay switch 1 can interrupt currents below the tripping threshold of the electromagnetic impact armature, in the example described here below 10 $I_N$. As can be seen, the use of the microrelay switch 1 according to the invention offers the advantage that response which is at least matched to the response time of the electromagnetic impact armature can be offered in the region of the currents which must otherwise be switched off by means of the bimetallic tripping of the power breaker 17 or by means of an electromagnetic contactor. In principle, in the region of the currents which can be switched off by the microrelay switch 1, it would also be possible to set an even faster response for the microrelay switch 1 than the value predetermined by the response time of the electromagnetic impact armature. However, this would result in the response of the microrelay switch 1 being dependent on the current, with a minimum response time only for relatively small overcurrents. However, in this exemplary embodiment, a response delay is invariably chosen which is matched to the response of the impact armature, taking into account the increased starting current of the electric motor, in the already described manner.

What is claimed is:

1. An electrical switching device comprising:
   a microrelay switch which is arranged in a current path and has microrelay cells connected in series as a voltage divider and connected in parallel as a current divider:
   a current sensor which detects a current flowing in the current path;
   an evaluation device for receiving and evaluating current signals detected by the current sensor and for forming a tripping signal, which acts on the microrelay switch, if the current being carried in the current path exceeds a threshold value; and
   a short-circuit current limiter arranged in the current path such that the short-circuit current limiter is connected in series with the microrelay switch; wherein
   the switching device is designed such that the microrelay switch opens in response to the tripping signal for small overcurrents that are greater than the threshold value, and, in the event of large overcurrents, the short-circuit current limiter limits these overcurrents to currents which can be interrupted by the microrelay switch.

2. The electrical switching device as claimed in claim 1, wherein the evaluation device causes the microrelay switch to respond with a short time delay as a function of the magnitude of any overcurrent.

3. The electrical switching device as claimed in claim 1, wherein the short-circuit current limiter is a fuse link.

4. The switching device as claimed in claim 1, wherein the short-circuit current limit can be uploaded electrically, and the evaluation device is designed to transmit a second tripping signal to the short-circuit current limiter in the event of large overcurrents.

5. The electrical switching device as claimed in claim 1, wherein the short-circuit current limiter is a power breaker.

6. The electrical switching device as claimed in claim 1, wherein the short-circuit current limiter is a PTC thermistor.

7. The electrical switching device as claimed in claim 6, wherein the PTC thermistor contains a PTC polymer material.

8. The electrical switching device as claimed in claim 6, wherein the PTC thermistor contains a PTC metal material.

9. The electrical switching device as claimed claim in 1, wherein the evaluation device is designed for receiving and evaluating signals from a first current sensor, which detects the current through the current path, and from a second current sensor, which detects a current through a second current path, by comparing them with one another and opening the microrelay switch in response to a result of an evaluation.

10. The electrical switching device as claimed in claim 1, wherein the current sensor is a total current sensor which detects a total current through the current path and through at least one second adjacent current path, and the evaluation device is designed for receiving and evaluating a signal from the total current sensor and for opening the microrelay switch in response to that signal.

11. The electrical switching device as claimed in claim 1, wherein at least one current sensor is part of the switching device and is in the, form of a Hall sensor.

12. The electrical switching device as claimed in claim 11, wherein the evaluation device and the Hall sensor or sensors are integrated on a chip.

13. The electrical switching device as claimed in claim 11, wherein the microrelay switch, the evaluation device and the Hall sensor or sensors are integrated on one chip.

14. The electrical switching device as claimed in claim 1, wherein the microrelay switch, the evaluation device and, possibly, the Hall sensor or sensors are each integrated as chips on a circuit board.

15. The electrical switching device as claimed in claim 1, wherein the microrelay switch and the evaluation device are integrated on one chip.

16. The electrical switching device as claimed in claim 1, wherein an electronic response monitoring device is integrated, with the microrelay switch, on one chip.

17. The electrical switching device as claimed in claim 1, wherein a timer circuit is integrated, with the microrelay switch, on one chip.

18. An electric motor switching and protection system having an electrical switching device as claimed in claim 1.

* * * * *